Jan. 12, 1937.   H. R. TEAR   2,067,294
LUBRICATING DEVICE
Filed June 11, 1934   2 Sheets-Sheet 1
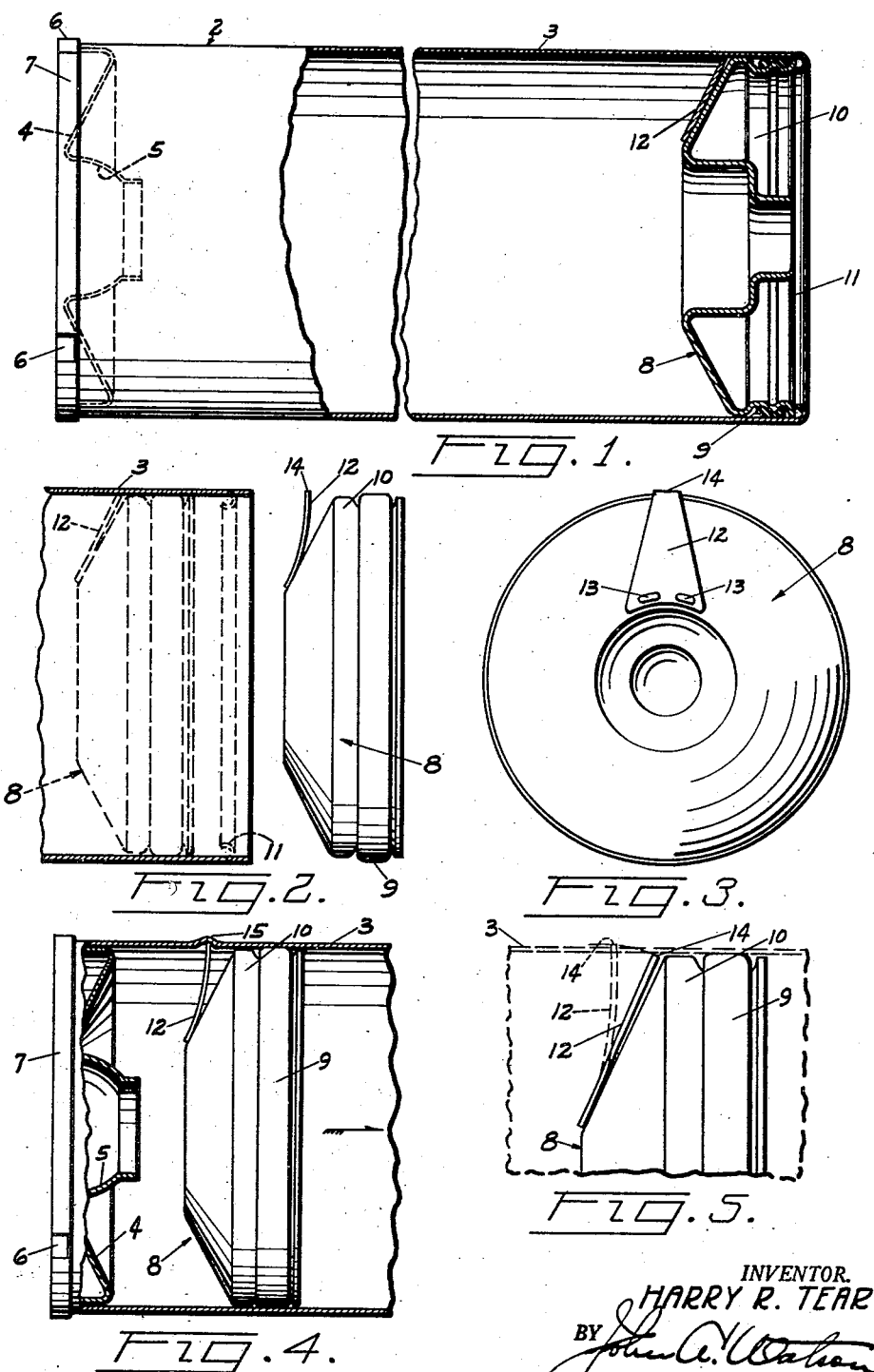
INVENTOR.
HARRY R. TEAR
BY
ATTORNEY Jan. 12, 1937.    H. R. TEAR    2,067,294
LUBRICATING DEVICE
Filed June 11, 1934    2 Sheets-Sheet 2

INVENTOR.
HARRY R. TEAR
BY *John A. Watson*
ATTORNEY

Patented Jan. 12, 1937

2,067,294

UNITED STATES PATENT OFFICE 2,067,294

LUBRICATING DEVICE

Harry R. Tear, Evanston, Ill., assignor to The Lubrication Corporation, South Bend, Ind., a corporation of Delaware Application June 11, 1934, Serial No. 730,015

8 Claims. (Cl. 221—47.3)

This invention relates to improvements in lubricating devices and more particularly to non-refillable cartridges for lubricating guns, dispensers, and the like.

One of the purposes of the distribution and sale of lubricants in cartridges is to assure the purchaser and user that the lubricant received is of a particular brand and quality. This purpose and advantage is lost, however, if the cartridges are capable of being refilled with lower grade lubricants subsequent to the discharge of the original contents therefrom as by unscrupulous parties.

An object of my invention is to provide a cartridge for lubricants wherein the lubricant confining space within the cartridge may not be filled again subsequent to the discharge of the original contents therefrom.

Another object is to provide a cartridge of the character described wherein forceful attempts to inject lubricant or other substance into the cartridge will result in the mutilation of the cartridge wall thus rendering the cartridge unfit for use.

A further object is to provide a cartridge of the character described having a piston adapted to be moved toward the outlet of the cartridge as the contents thereof is discharged and wherein the piston is incapable of appreciable retractile movement, regardless of the position of the piston within the cartridge and of the quantity of lubricant, if any, remaining in the cartridge.

A further object is to provide a cartridge of the character described wherein retractile movement of the piston thereof as by a forceful filling of the lubricant confining space or by the application of manual thrust to the piston will result in piercing the cartridge wall.

Other objects, the advantages, and uses of the invention will be, or should become, apparent after reading the following specification and claims and after consideration of the drawings, forming a part of the specification, wherein:

Fig. 1 is a partial sectional view of a lubricant cartridge constructed in accordance with the invention;

Fig. 2 is a sectional view illustrating a step in the method of assembly of the cartridge;

Fig. 3 is a front elevation of the cartridge piston;

Fig. 4 is a fragmentary sectional view of the cartridge as it appears during, and subsequent to, forceful retractile piston movement;

Fig. 5 is an enlarged fragmentary view of the cartridge piston illustrating the piston locking means therefor;

Figure 6:
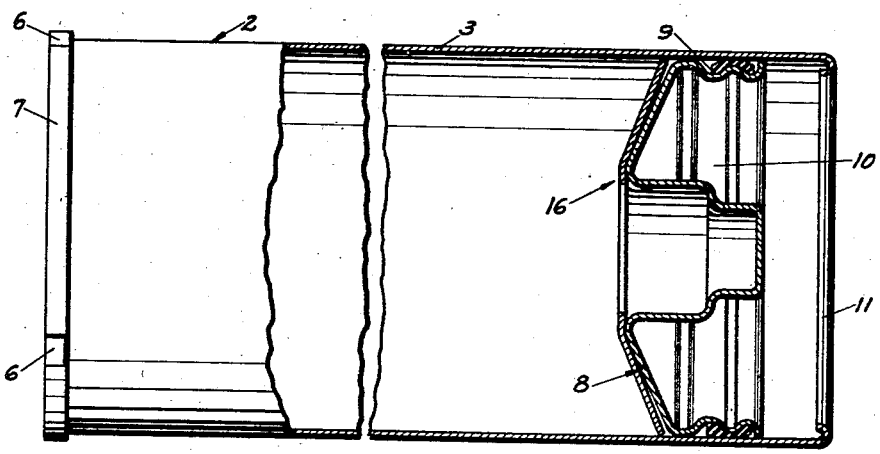
Fig. 6 is a view similar to Fig. 1 of another form of the cartridge.

In general my invention is applicable to any type of cartridge or container having an outlet opening at one end and a piston slidably mounted therein and adapted to follow the contents of the cartridge or container as it is urged toward the outlet opening thereof.

In Fig. 1, I have illustrated an embodiment of the invention comprising a lubricant cartridge 2 of the type intended for use as an interchangeable lubricant supply unit for hand guns and similar lubricating devices. The cartridge comprises a tubular body 3, of uniform internal diameter, having an end closure 4 at the forward end provided with a centrally located outlet opening, the walls 5, of which, may be fashioned for sealing engagement with a suitable connector stud forming a part of the lubricant gun or apparatus (not shown) with which the cartridge is to be used. Bayonet lugs 6 may be formed in the seam 7 between the wall of the body 3 and the end closure 4 for use in the quick attachment and detachment of the cartridge to and from the supporting structure of the lubricating apparatus.

A piston 8, which may be stamped from sheet metal, having a packing ring 9 on the outer wall of the skirt 10, is located within the tubular body 3 and is free to move under the influence of atmospheric pressure, or under mechanical thrust, applied thereto in the direction of the inner end of the cartridge as the lubricant content of the cartridge is discharged therefrom through the outlet opening. In order that substantially all of the lubricant contents may be discharged, the contour of the head of the piston 8 follows that of the contour of the inner wall of the end closure 4. In the cartridge shown a "dished" piston and closure contour is employed to lend rigidity to the structures thereof.

I have illustrated, in Fig. 2, a step in the assembly of the cartridge of Fig. 1. The tubular body 3 of the cartridge is illustrated as it appears prior to the introduction of the piston 8 thereto and to the rolling of the bead 11 in the rearward end thereof. The position of the piston 8 after introduction into the cartridge body as well as the formation of the bead 11 is illustrated in dotted lines.

With reference to Figs. 2 and 3 it will be noted that a tongue 12, which may be formed of spring steel, is secured, as by spot-welding, at 13 to the inner side of the piston head and extends radially outward and normally beyond the periphery of the packing member 9. When the piston is introduced into the tubular body 3 of the cartridge, the tongue 12 is forced into a position substantially parallel with the outer face of the piston head, as illustrated in dotted lines on Fig. 2, the outer end 12 of the tongue bearing against the inner wall of the tubular body. The provision of the tongue 12 does not in any way impair the forward movement of the piston 8 along the longitudinal axis of the cartridge such as may be expected to occur during the normal operation of the cartridge in discharging the contents thereof. Should one attempt, however, to fill the cartridge, as by the introduction of lubricant under pressure through the outlet opening in the closure 4, the rearward or retractile movement of the piston under the force of lubricant pressure acting thereupon would cause the tongue 12 to "bite" into the wall of the tubular body 3, as illustrated at 15 in Fig. 4, thus to mutilate the cartridge body wall and to prevent further rearward, or retractile, piston movement.

The function of the tongue 12, as described, may be best understood by referring to the enlarged view of the piston and tongue structure in Fig. 5 wherein the cartridge body wall is illustrated in dotted lines and the piston in full lines. The tongue 12 as shown in full lines represents the position it occupies during normal piston operation. The dotted line representation of the tongue illustrates the position of the tongue 12 upon the rearward movement of the piston. As indicated in Fig. 5, the outer end 14 of the tongue is urged outwardly from the longitudinal axis of the piston a distance determined by the increase in angle between the tongue 12 and the piston axis as it approaches an angle of ninety degrees. In the dotted line position, the outer end 14 of the tongue lies beyond the normal position of the outer wall of the tubular body 3 and therefore mutilation of the body wall must take place as the position of the tongue is thus shifted through the enforced rearward or retractile movement of the piston.

In the embodiment shown in Figs. 1 to 5 inclusive, mutilation of the cartridge body as described permanently destroys the usefulness of the cartridge for the depression formed in the inner wall of the cartridge body securely and effectively locks the piston against further rearward movement and therefore precludes the disposition of lubricant into the cartridge as through the outlet opening.

My improved cartridge possesses, in addition to the features of non-refillability and actual destruction of the usefulness of the cartridge through attempt to refill, all of the features and desirable characteristics of an interchangeable lubricant cartridge of the general character described. In other words, the addition of the structure for preventing re-use of the cartridge does not in any way impair or alter the fundamental features of cartridge operation.

Figure 7:
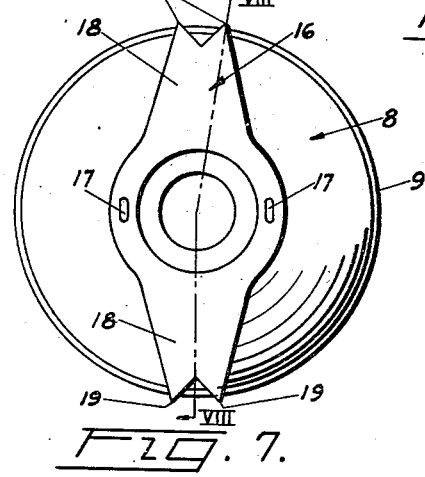
Fig. 7 is a front elevation of the piston of the cartridge of Fig. 6.

In Figs. 6 to 9, I have illustrated another form of the cartridge which differs from that form illustrated in Figs. 1 to 5 inclusive in the construction and functioning of the piston locking and cartridge mutilating tongue. In this form of the cartridge the tongue as illustrated at 16 may comprise a spring metal stamping fixed to the central portion of the head of the piston 8, as by spot-welding, as indicated at 17. The stamping, as shown, has diametrically opposed and radially extending portions 18 which normally extend beyond the periphery of the packing 9. The outer ends of the portions 18 may be formed with a pair of sharp points 19. The piston is illustrated in Fig. 7 as it appears prior to the introduction thereof into the tubular body 3 of the cartridge.

Figure 8:
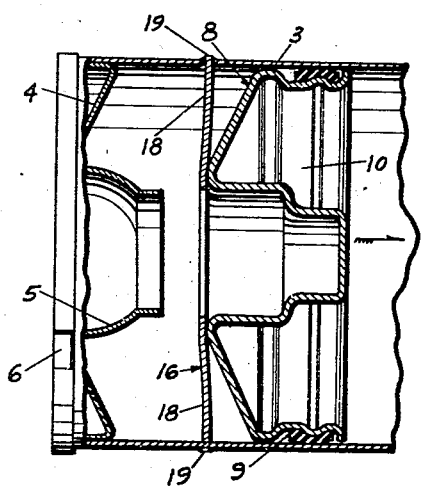
Fig. 8 is a view similar to Fig. 4 of the cartridge of Fig. 6.
Figure 9:
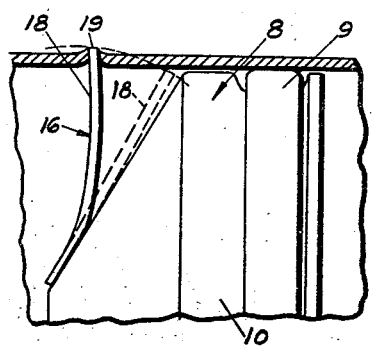
Fig. 9 is a view similar to Fig. 5 of the cartridge piston of Fig. 6.

In operation the piston of Fig. 7 functions substantially in the same manner as the piston previously described, and illustrated in Figs. 1 to 5, except that the sharp points 19, located upon diametrically opposite sides of the piston, serve to pierce the relatively thin metal walls of the tubular body 3 upon forceful retractile movement of the piston, as illustrated in Fig. 8. An advantage of the piston of Fig. 7 is that aside from puncturing the cartridge wall thereby to cause a leakage of any lubricant fed into the cartridge through the opening 5, continued and forceful attempts at retracting the piston would only result in tearing away the cartridge body wall. In Fig. 9, I have illustrated, after the manner of Fig. 5, the positions of the tongues 18 in normal operating position and in locking position, the positions being located in full and dotted lines respectively.

While I have illustrated and described the novel features of my invention as embodied in interchangeable lubricant cartridges for use with lubricant guns and similar apparatus, it should be understood that the features of the invention, as claimed, may be incorporated in any type of container or cartridge, regardless of contents, wherein a piston is employed as one of the confining walls of the container or cartridge confining space and adapted to move as the contents are discharged or withdrawn therefrom, the precise embodiments of the piston construction disclosed being presented for the purpose of illustration only.

I claim:

1. A cartridge of the character described comprising, a hollow cylindrical body, a permanent closure for one end of said body having an outlet opening therethrough, a piston forming a closure for the opposite end of said body and adapted to be moved toward said outlet opening, and a metal tongue secured to said piston, on the side thereof toward the outlet opening, engageable with the inner wall of said cylindrical body, said tongue extending rearwardly and radially from its point of attachment to the piston, and so supported as to swing radially outward upon rearward movement of the piston, thereby to impede such rearward movement and to mutilate the body wall.

2. A cartridge of the character described comprising, a hollow cylindrical body, a permanent closure for one end of said body having an outlet opening therethrough, a piston forming a closure for the opposite end of said body and adapted to be moved toward said outlet opening, and a pair of metal tongues secured to the side of the piston toward the outlet opening and extending rearward and radially outward in opposite directions into engagement with the inner wall of said cylindrical body.

3. A cartridge of the character described comprising, a hollow cylindrical body, a permanent closure for one end of said body having an outlet opening therethrough, a piston forming a closure for the opposite end of said body and adapted to be moved toward said outlet opening, and a metal tongue secured to said piston on the side thereof toward the outlet opening, engageable with the inner wall of said cylindrical body, said tongue being inclined rearwardly as it approaches the body wall and formed at its outer end with a sharp point thereby to pierce the body wall upon rearward movement of the piston.

4. In a cartridge of the character described, a substantially rigid piston adapted to bear upon the contents of the cartridge and to move along the axis of the cartridge as the contents are expelled, and a tongue secured to the side of the piston adjacent said contents and extending radially and rearwardly from the central portion of the piston to a point beyond the outer side wall of the piston.

5. In a cartridge of the character described, a substantially rigid piston adapted to bear upon the contents of the cartridge and to move along the axis of the cartridge as the contents are expelled, and a tongue secured to the side of the piston adjacent said contents and extending radially and rearwardly from the central portion of the piston to a point beyond the outer side wall of the piston, said tongue having a sharp point at its outermost end for piercing the wall of said cartridge when the piston is moved rearwardly therein.

6. In a cartridge of the character described, a substantially rigid piston adapted to bear upon the contents of the cartridge and to move along the axis of the cartridge as the contents are expelled, the side of the piston adjacent to said contents including a wall portion sloping rearwardly radially outwardly from a point adjacent its center, and a tongue secured to said side of the piston to lie against said sloping wall portion when the piston is moved forward toward said contents and to engage the cartridge wall and move away from said wall portion to resist rearward movement of the piston.

7. In a cartridge of the character described, a substantially rigid piston adapted to bear upon the contents of the cartridge and to move along the axis of the cartridge as the contents are expelled, the side of said piston toward the contents being formed with a truncated conical wall portion, and a tongue secured to said side of the piston and normally lying along said conical wall portion, said tongue being adapted to engage the cartridge wall to resist motion of the piston in a direction away from the contents.

8. In a cartridge of the character described, a substantially rigid piston adapted to bear upon the contents of the cartridge and to move along the axis of the cartridge as the contents are expelled, the side of the piston toward the contents being formed with a conical wall portion, and a pair of diametrically opposite tongues secured to said side of the piston and normally lying along said wall portion, said tongues being adapted to engage the cartridge wall to resist motion of the piston in a direction away from the contents.

HARRY R. TEAR.